United States Patent
Holman et al.

(10) Patent No.: US 6,408,124 B1
(45) Date of Patent: Jun. 18, 2002

(54) CABLE STORAGE CARTRIDGE

(75) Inventors: John C. Holman, Coon Rapids; Trevor D. Smith, St. Louis Park; Thomas C. Tinucci, Eden Prairie, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/666,967

(22) Filed: Sep. 21, 2000

(51) Int. Cl.[7] .................................................. G02B 6/00
(52) U.S. Cl. ...................................................... 385/135
(58) Field of Search ................................ 385/135, 136, 385/137

(56) References Cited

U.S. PATENT DOCUMENTS

| | | | |
|---|---|---|---|
| 4,585,303 A | 4/1986 | Pinsard et al. | 385/135 |
| 4,630,886 A | 12/1986 | Lauriello et al. | 385/135 |
| 4,702,551 A | 10/1987 | Coulombe | 385/135 |
| 4,717,231 A | 1/1988 | Dewez et al. | 385/135 |
| 4,722,585 A | 2/1988 | Boyer | 385/135 |
| 4,752,110 A | 6/1988 | Blanchet et al. | 385/135 |
| 4,765,708 A | 8/1988 | Becker et al. | 385/135 |
| 4,765,709 A | 8/1988 | Suillerot et al. | 385/135 |
| 4,792,203 A | 12/1988 | Nelson et al. | 385/135 |
| 4,798,432 A | 1/1989 | Becker et al. | 385/135 |
| 4,818,054 A | 4/1989 | George et al. | 385/135 |
| 4,840,449 A | 6/1989 | Ghandeharizadeh | 385/135 |
| 5,013,121 A | 5/1991 | Anton et al. | 385/135 |
| 5,069,523 A | 12/1991 | Finzel et al. | 385/135 |

FOREIGN PATENT DOCUMENTS

WO    WO 96/19745    6/1996

OTHER PUBLICATIONS

ODF—system MAXI. The date appears to be Nov. 27, 1996 as shown at bottom right of first page.

*Primary Examiner*—Tulsidas Patel
(74) *Attorney, Agent, or Firm*—Merchant & Gould P.C.

(57) ABSTRACT

A cable storage cartridge and assembly for storing an excess length of cable. The cartridge includes a rectangular carriage frame and a spool rotatably disposed inside the carriage frame. The spool is comprised of a first spool member having a radius protection loop channel on its top surface and a second spool member. Together the first spool member and second spool member define a storage chamber. The storage chamber lies in a different plane than the loop channel of the first spool member. The first spool member defines transition openings for allowing the cable to pass from the loop channel to the storage chamber. Carriage frame includes detent and catch tabs for retaining the cartridge inside a cartridge housing.

16 Claims, 10 Drawing Sheets

CABLE STORAGE CARTRIDGE

This invention pertains to a communication system in which signals are carried through cables or optical fibers. More particularly, this invention pertains to a storage container for taking up and storing excess amounts of cable or fiber.

BACKGROUND OF THE INVENTION

The telecommunications industry is rapidly proceeding with the development and installation of optical fiber transmission systems. An optical fiber networks and other cable networks require numerous techniques for managing and connecting a large number of cables.

In the management of cables and optical fibers, it is necessary from time to time to provide slack or excess amounts of cable lengths. In order that cable network systems are neatly arranged and manageable, the excess amounts must be stored in a neat and orderly manner for facilitating ease of use of the network apparatus.

Devices for storing excess amounts of optical fiber cables are known in the art. For example, commonly assigned U.S. Pat. No. 5,013,121 to Anton et al. issued May 7, 1991 teaches a cable storing apparatus which includes a spool for holding excess lengths of cable. In addition, U.S. Pat. No. 4,792,203 to Nelson et al. issued Dec. 20, 1988 teaches an optical fiber distribution apparatus which includes a spool for holding excess fiber from a trunk cable. Similarly, U.S. Pat. No. 4,798,432 to Becker et al. dated Jan. 17, 1989 teaches a storage container for a section of an optical fiber.

Notwithstanding advances made in the art, there is a continuing need for improvement in cable storage apparatus. One disadvantage of the prior art apparatus is illustrated in the aforesaid U.S. Pat. No. 4,792,203. In that apparatus, only multiples of predetermined fixed lengths of excess fiber can be stored on the spool. Namely, any complete winding requires approximately the same amount of excess fiber as any prior winding around the spool. Accordingly, the spool does not accommodate a wide variety of excess cable lengths.

In U.S. Pat. No. 4,798,432, the loading is difficult requiring use of a pincers (see FIG. 4, item 16 of U.S. Pat. No. 4,798,432). Also, and perhaps more importantly, U.S. Pat. No. 4,798,432 is not conveniently used with fiber optic patch cords terminating at attached connectors. In the aforesaid patent, the hole through which the fiber is to be fed is too small to accommodate a connector. If the part were made larger to accommodate a connector, the storage density of the system would be reduced to an impractical level.

Furthermore, in U.S. Pat. No. 5,013,121, the amount of storage capacity is limited by the fact that the cable is wound around the outside of the radius limiting configuration on top of the spool. Therefore, the device quickly reaches its capacity and must be increased in width in order to store longer cable lengths.

It is an object of the present invention to provide an improved storage container for cable telecommunication systems including fiber optic systems with enhanced performance and storage density while maintaining low manufacturing costs.

SUMMARY OF THE INVENTION

One aspect of the present invention relates to a cable storage cartridge having a carriage frame and first and second spool members. The spool members cooperate to form a spool which rotates within the carriage frame. The first spool member includes a loop channel for removably fixing a loop end of the cable to be stored to the spool. The spool members are configured with a center post around which the cable is wrapped for storage. A storage chamber defined by the spool members and the carriage frame lies in a plane spaced from the plane occupied by the loop channel of the first spool member allowing for increased cable storage density. The cable passes from the loop channels to the storage chamber by means of transition holes defined by the first spool member.

Another aspect of the present invention relates to a cable storage assembly which includes a cable cartridge as described above as well as a cartridge housing for storing multiple cable cartridges in close proximity.

Another aspect of the present invention relates to providing detent tabs and catch tabs on a cable cartridge as described above for retaining the cartridge in a closed position or retaining the cartridge in an open position respectively.

DETAILED DESCRIPTION

Figure 1:
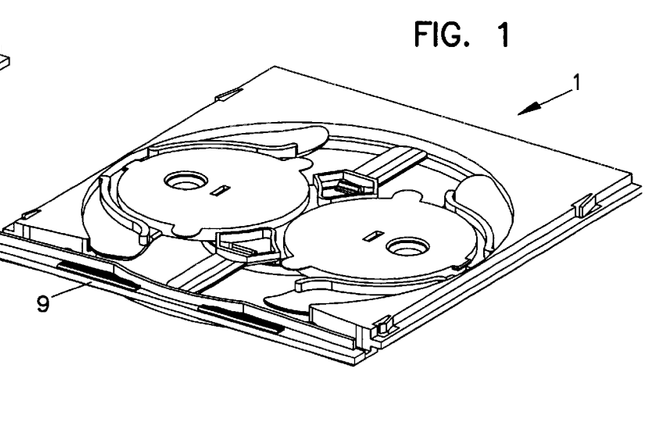
FIG. 1 is a perspective view of a cable storage cartridge according to the present invention.
Figure 2:
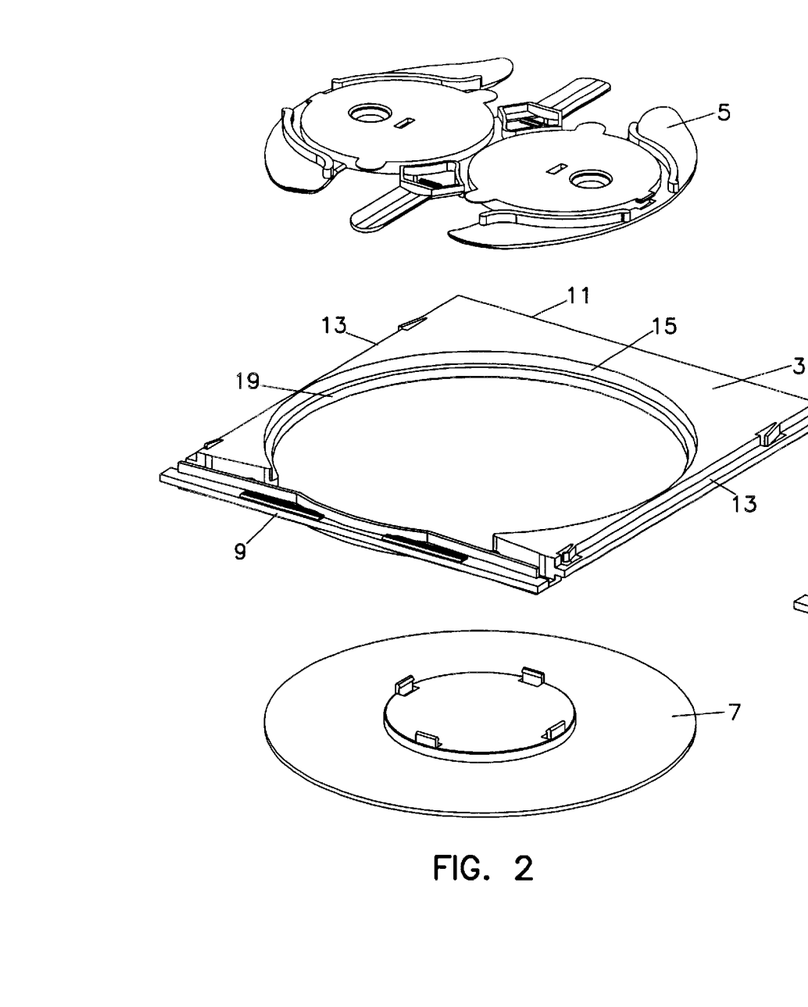
FIG. 2 is an assembly view of the cable storage cartridge of FIG. 1.
Figure 3:
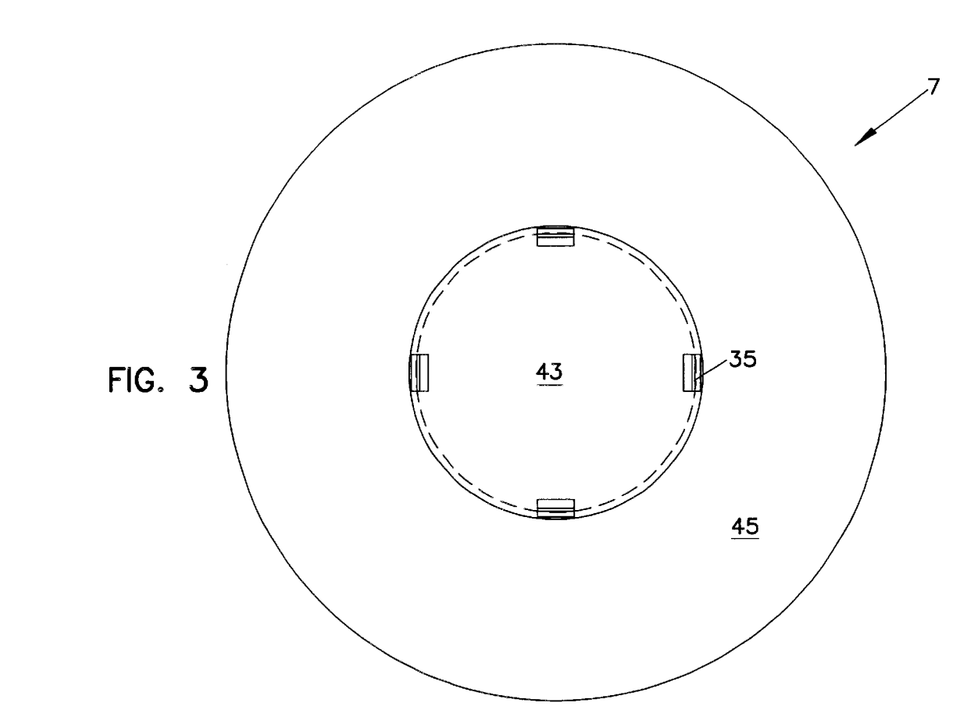
FIG. 3 is a top view of a lower spool member according to the present invention.

Referring now to the several drawing figures in which identical elements are numbered identically throughout, a cable storage cartridge 1 according to the present invention is shown. A shown in FIGS. 1 and 2 the cartridge 1 includes a carriage frame 3, an upper spool member 5 and a lower spool member 7. Although the terms upper and lower will be used for convenience throughout this specification, it is to be understood that the orientation of the spool members is not critical to the invention, and, therefore, the invention may include first and second spool members where either spool member may be oriented as the upper spool member or may even be oriented in a non-vertical alignment such as horizontally or at some angle between vertical and horizontal.

The upper spool member 5 and the lower spool member 7 combine to form a spool. The spool members 5 and 7 are rotatably received by the carriage frame 3 so that the spool formed by the spool members 5 and 7 may freely rotate relative to the carriage frame 3.

Figure 8:
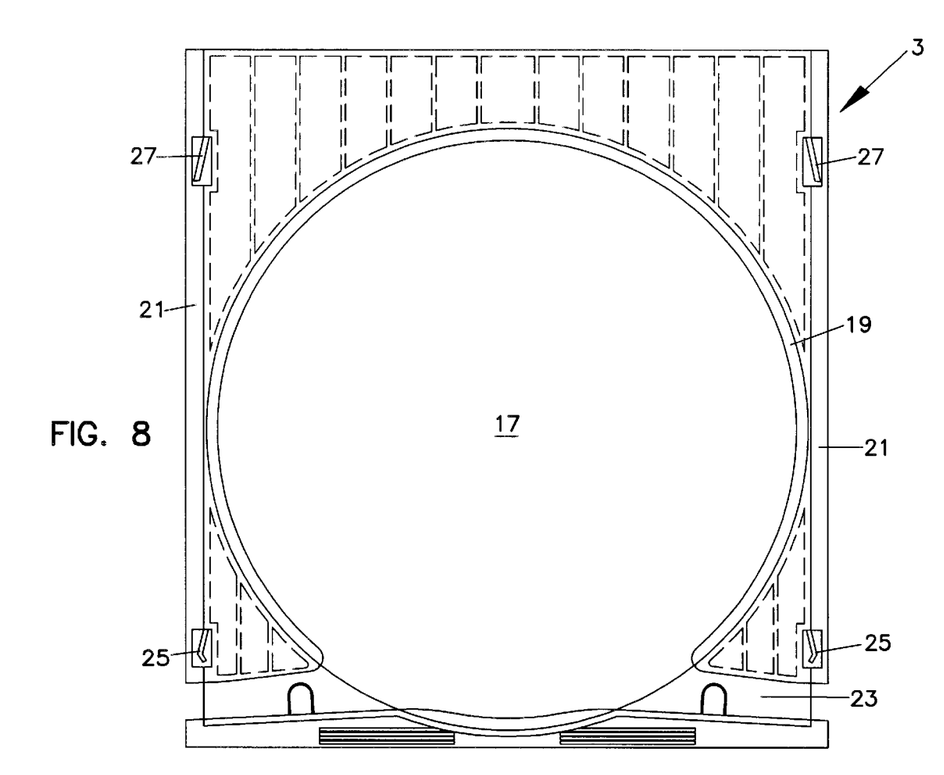
FIG. 8 is a top view of a carriage frame according to the present invention.
Figure 9:
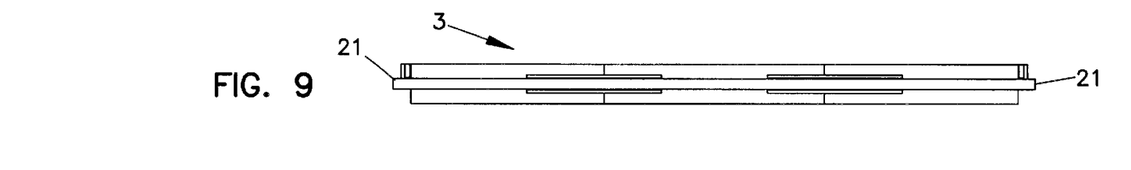
FIG. 9 is a front view of the carriage frame of FIG. 8.
Figure 10:
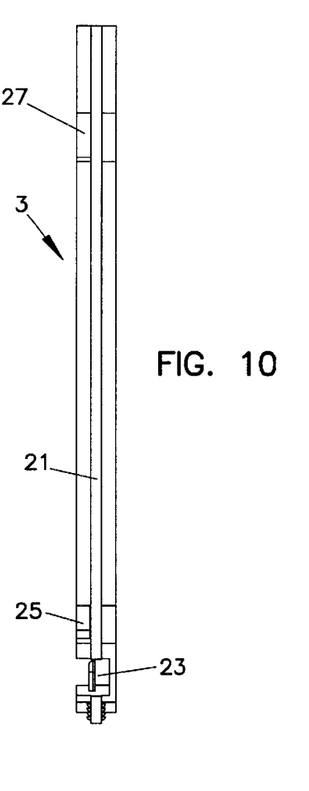
FIG. 10 is a side view of the carriage frame of FIG. 8.

As shown in FIGS. 8–10, carriage frame 3 is generally planar and rectangular in shape and presents a front end 9, a back end 11, and two side edges 13. The carriage frame 3 includes an internal wall 15 which defines a spool aperture 17. The internal wall 15 includes an annular rail 19 around the perimeter of the spool aperture 17.

Figure 5:
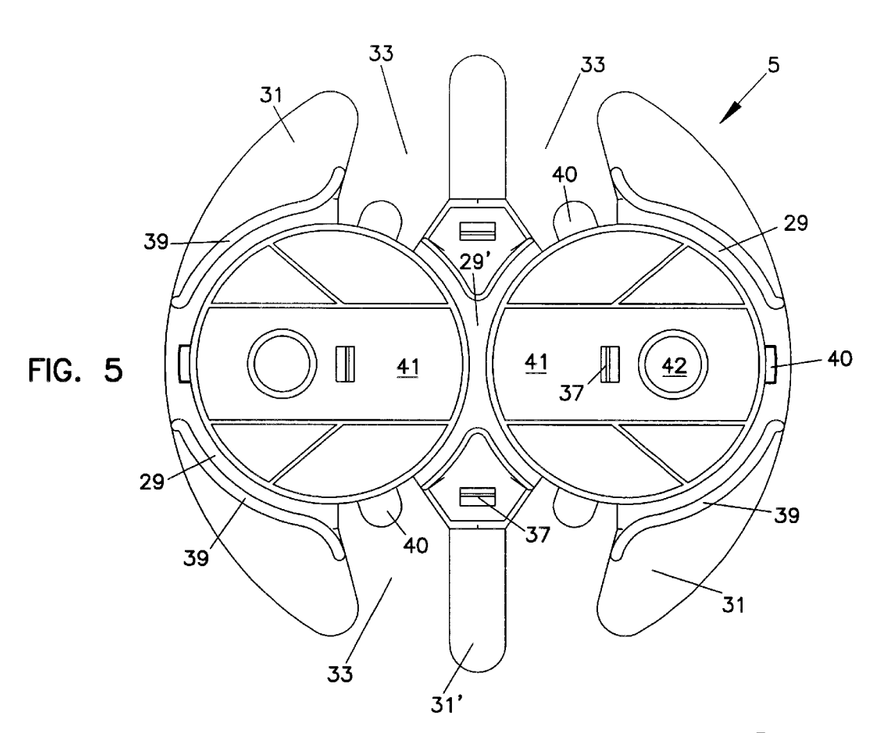
FIG. 5 is a top view of an upper spool member according to the present invention.
Figure 6:
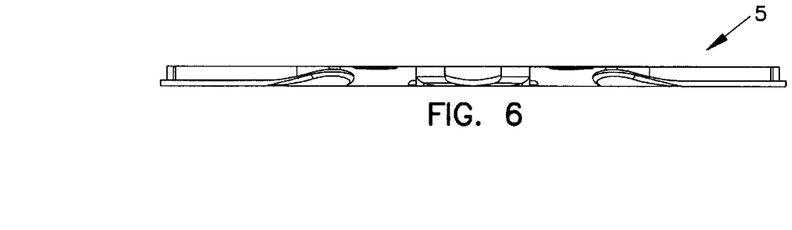
FIG. 6 is a front view of the upper spool member of FIG. 5.
Figure 7:
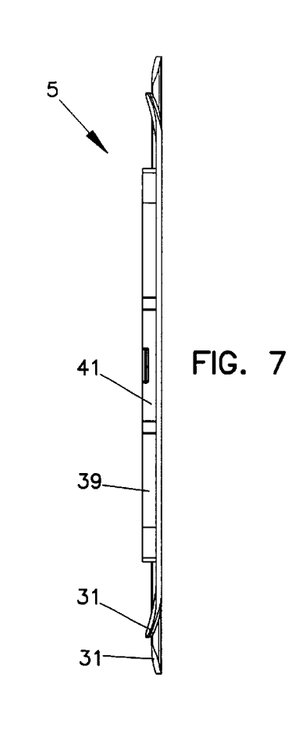
FIG. 7 is a side view of the upper spool member of FIG. 5.

The upper spool member 5 includes a loop channel 29. The loop channel 29 is configured to removably retain a loop end of the cable in a fixed position relative to the upper spool member 5. The loop channel 29 is configured to maintain a bend radius equal to or greater than a minimum bend radius of the cable to be stored. The 10 upper spool member 5 may include a number of guide tabs 40 to retain and organize the loop end of the cable as is winds through the loop channel 29.

The loop channel 29 may be comprised of curvilinear track walls 39 and circular members 41. The curvilinear track walls 39 closely follow portions of the outer edge of the circular members 41, thereby forming the loop channel 29. Preferably, the width of the loop channel 29 is approximately equal to the thickness of the cable to be stored. The channel should at least be less than 2 times the thickness of the cable to be stored so that the cable loop may be retained in the loop channel 29. The two circular members 41 may be located in close proximity to each other to form a portion of the loop channel 29' between them. The length of the loop channel 29 lies generally in a single plane.

The upper spool member 5 includes an upper flange surface 31. The flange surface is shaped and sized to be received by the spool aperture 17 of the carriage frame 3 and to rest against the annular rail 19 of the internal wall 15. The lower spool member 7 includes a bottom flange surface 45 and a center post 43. The bottom flange surface 45 of the lower spool member 7 is sized and shaped to be received by the spool aperture 17 of the carriage frame 3 and to rest against the annular rail 19 of the internal wall 15. The center post 43 has radius equal to or greater than the minimum bend radius of the cable to be stored. The upper flange surface 31 in combination with the bottom flange surface 45, the center post 43, and the annular rail 19 form an annular storage chamber 47 for storing lengths of cable. The cable is wrapped around the center post 43 of the lower spool member 7 inside the storage chamber 47. Although the preferred embodiment shown in the figures shows the center post 43 being disposed on the lower spool member 7, it is to be understood that the center post 43 may equivalently be disposed on the upper spool member 5.

The upper flange surface 31 defines a plurality of transition openings 33. The transition openings 33 allow the cable to pass from the loop a 9 to the storage chamber 47. The transition openings 33 may be separated by cable management blades 31' which form a part of the upper flange surface 31. The upper flange surface 31 including the cable management blades 31' act to contain the cable within the storage chamber 47.

Significantly, the storage chamber 47 is located in a plane which lies beneath the plane occupied by the loop channel 19. That is, the lengths of cable to be stored are not wrapped around the elements which form the loop channel 29, but rather, the lengths of cable pass beneath the upper flange surface 31 by means of the transition openings 33 before being coiled around the center post 43. The cable storage cartridge 1 is thereby split into two levels, a radius protection level which holds the loop end of the cable and a storage level which stores coils of the cable wound around the center post 43. In this manner, the cartridge permits more efficient use of storage space, for by dividing the radius protection level from the storage level, the width of the cartridge 1 may be made significantly smaller while only slightly increasing its thickness and maintaining the same storage capacity.

The upper spool member 5 combines with the lower spool member 7 by means of clip posts 35 and holes 37. The holes may be in either the upper or lower spool member with the opposing posts being located on the opposite spool member. The upper and lower spool members 5 and 7 capture the annular rail 19 of the carriage frame 3 between them. The upper spool member 5 may include finger holes 42 to aid in rotation of the spool inside the carrier frame 3.

The carriage frame 3 defines an entry channel 23 near its front end 9. The entry channel 23 permits the lengths of cable to pass from the storage chamber 47, through a side edge 13 and out of the cartridge 1. The cartridge may contain two entry channels 23 as is shown in the figures, thereby allowing access to the cartridge from two different directions. The symmetry of the loop channel is advantageous. The loop and of the cable may be routed either for rotation with the spool in a clockwise direction or for rotation with the spool in a counterclockwise direction. This allows the spool to store cable approaching the cartridge from one of a number directions. Therefore, the second entry channel permits access to the storage chamber from a direction other than the direction leading to the first channel.

Figure 12:
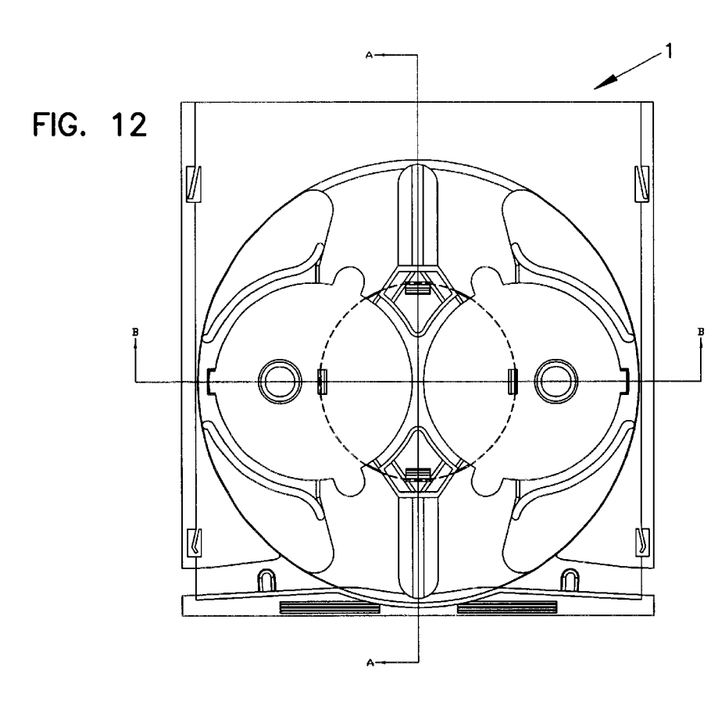
FIG. 12 is a top view of the cable storage cartridge of FIG. 1.
Figure 12A:
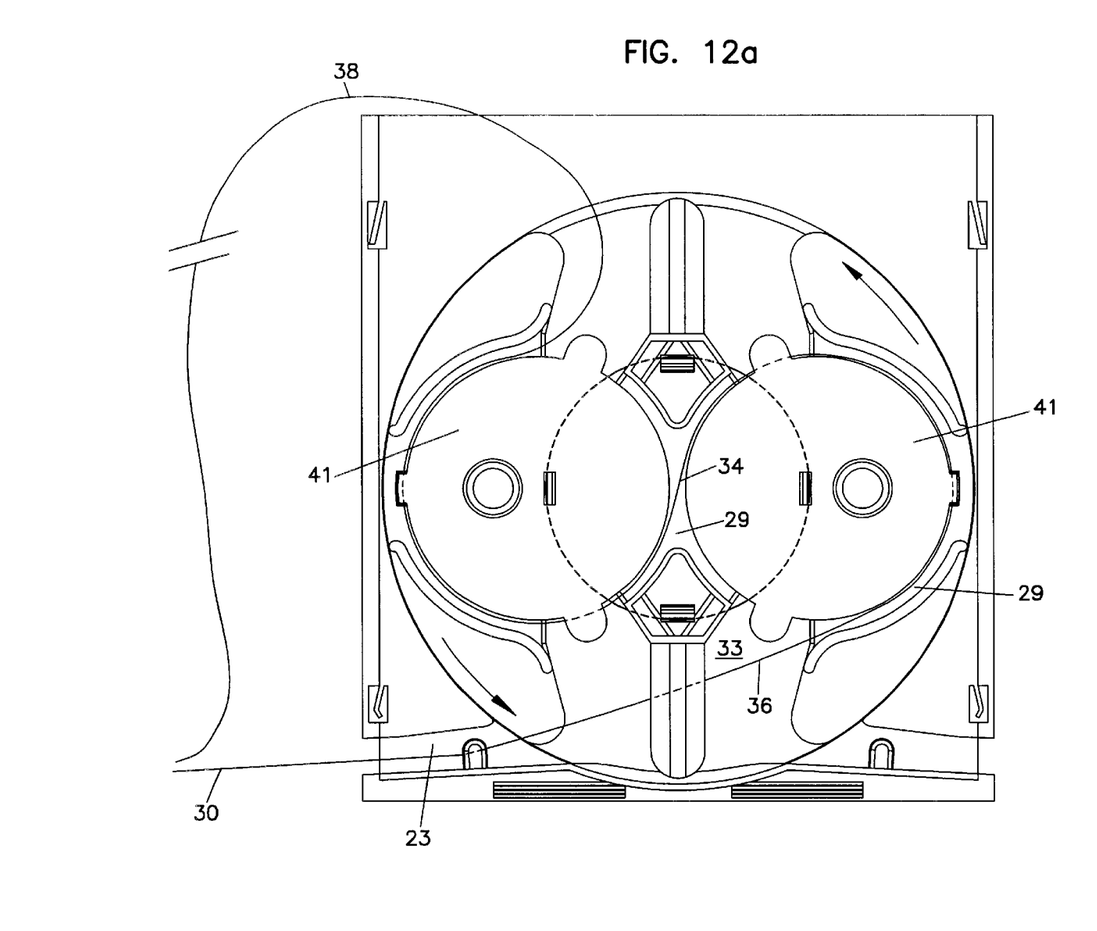
FIG. 12a is a top view of the cable storage cartridge of FIG. 1 showing the path of a cable being loaded into the cartridge.
Figure 12B:
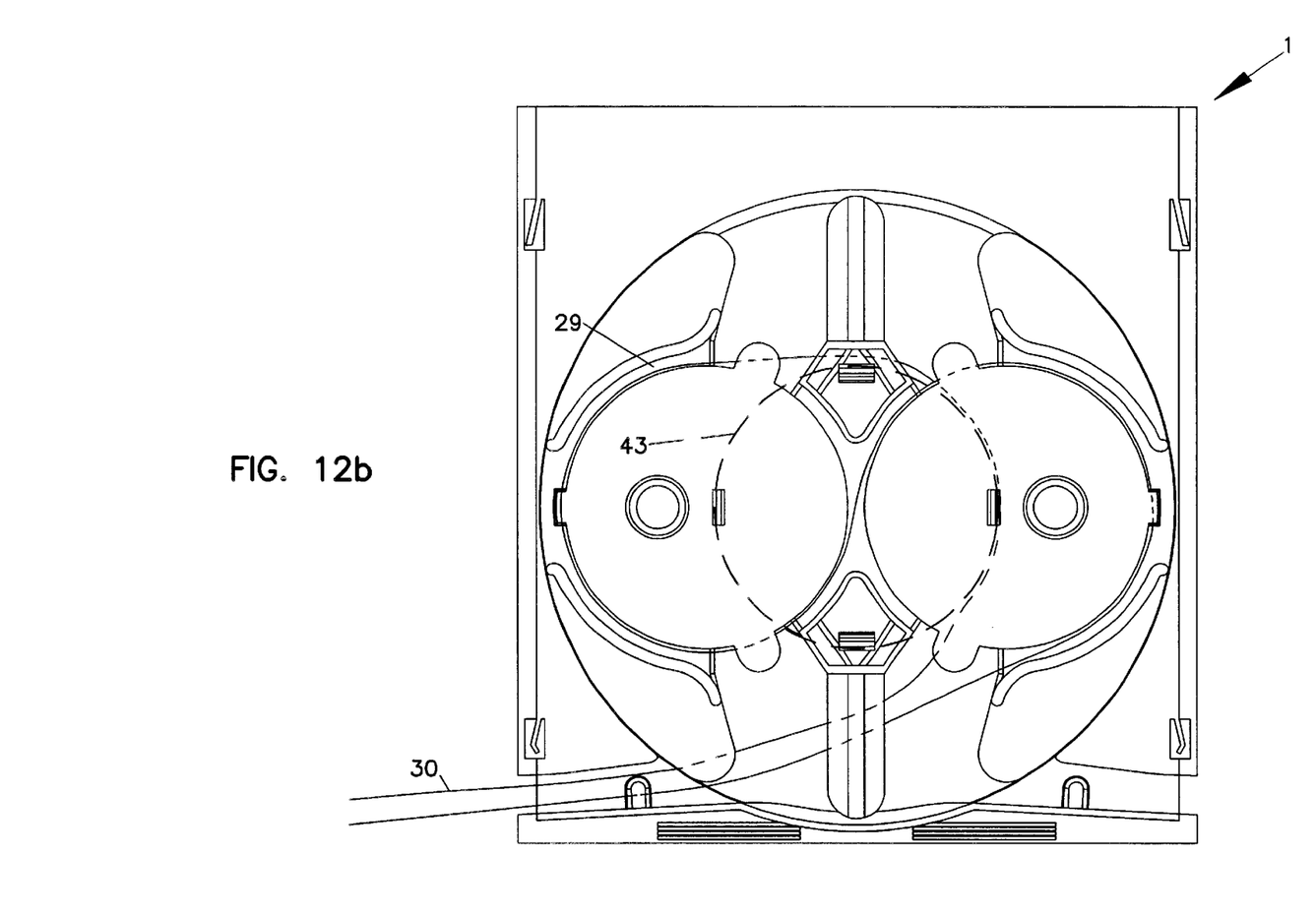
FIG. 12b is a top view of the cable storage cartridge of FIG. 1 showing the path of a cable to be stored in the cartridge.
Figure 13:
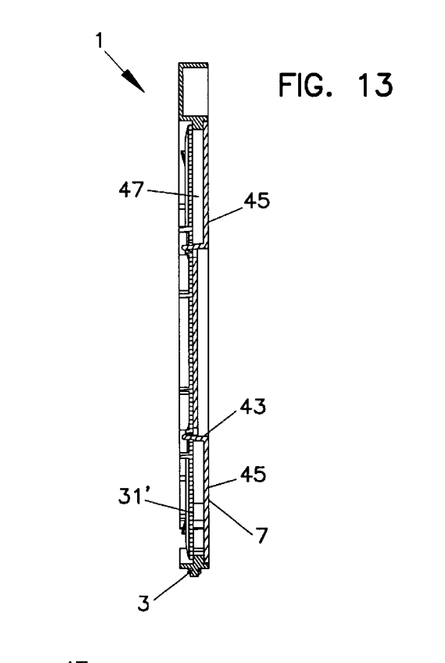
FIG. 13 is a side cross section along line A—A of the cable storage cartridge of FIG. 12.
Figure 14:
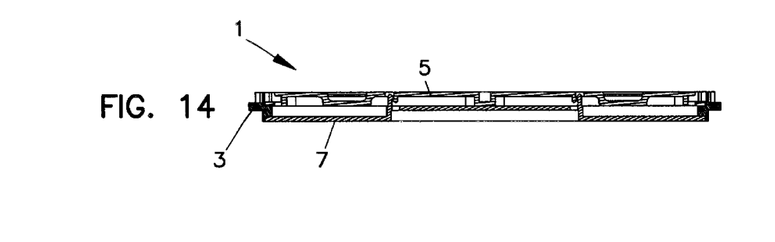
FIG. 14 is a front cross section along line B—B of the cable storage cartridge of FIG. 12.
Figure 15:
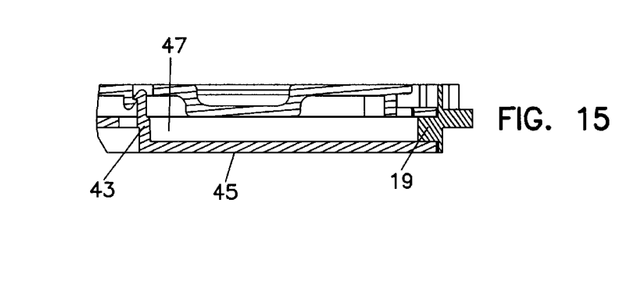
FIG. 15 is a detail view of FIG. 14.

Thus, as shown in FIG. 12a, the cable may be loaded into the cartridge by placing a center point 34 of the loop end of the cable into the loop channel 29 at a point between the two circular members 41. The cable is then placed inside the loop channel 29 around the circular members 41. A first length of cable 36 is transitioned to the chamber 47 through a transition opening 33, transitioning two cable lengths thereby created to the storage chamber 47 through the transition openings 33 and is then placed in the entry channel 23. A second length of cable 38 cannot be transitioned to the storage chamber through a transition opening until the spool is rotated in the direction of the arrows shown in FIG. 12a. Once the spool has been rotated as shown in FIG. 12b, the second length of cable 38 may also be placed in the entry channel 23. Thereafter rotating the spool inside the carriage frame 3 will wind the lengths of cable onto the center post 43 inside the storage chamber 47. The cable may be removed from the cartridge 1 simply by pulling the desired length of cable back through the entry channel 23.

Figure 11A:
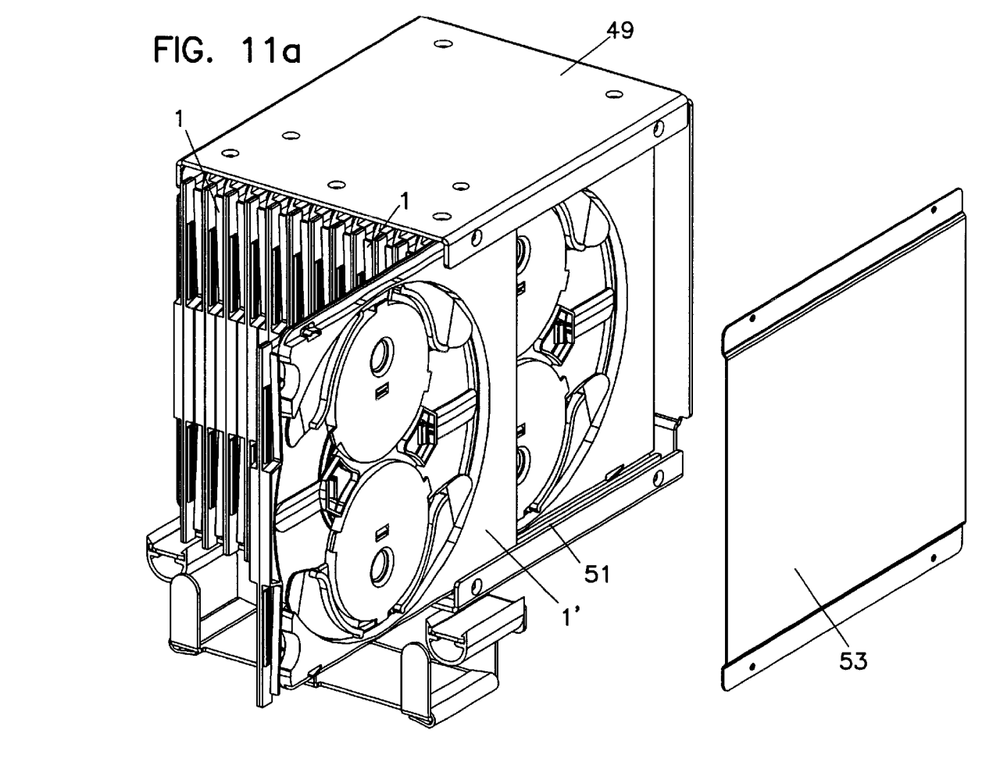
FIG. 11a is a perspective view of a cable storage assembly according to the present invention with a side panel detached to expose the interior and showing a cable cartridge in open position.
Figure 11B:
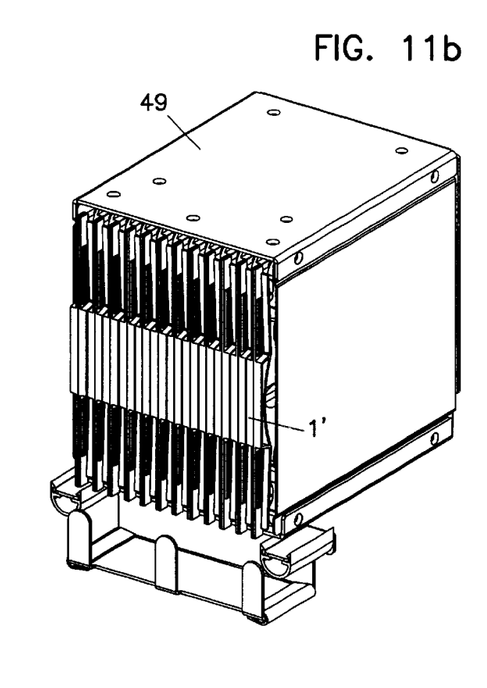
FIG. 11b is a perspective view of the cable storage assembly according to the present invention showing cable cartridges all in a closed position.
Figure 16:
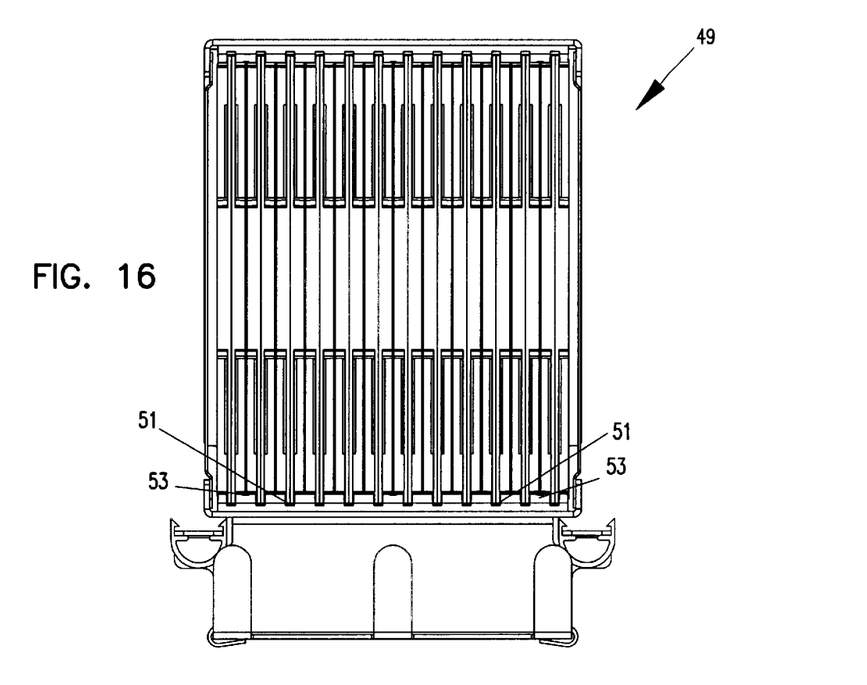
FIG. 16 is a front view of the cable housing shown in FIG. 11b.
Figure 17:
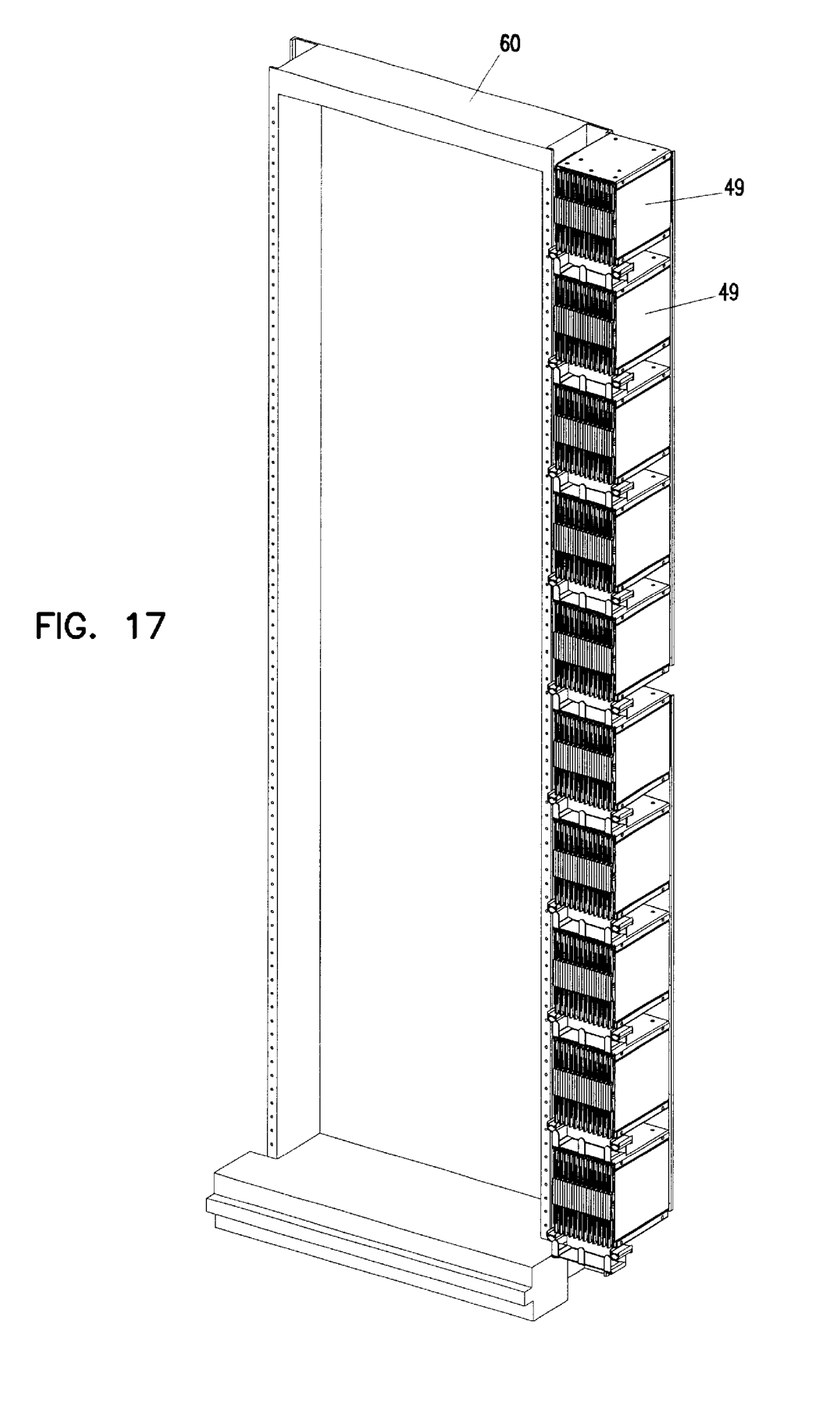
FIG. 17 is a perspective view of a chassis containing a number of cartridge housings for storing cables and cable cartridges according to the present invention.

The carriage frame includes side rails 21 along its side edges 13 for slidably loading the cartridge 1 into a cartridge housing 49 as shown in FIGS. 11a and 11b. FIG. 11a shows a cartridge housing having a side panel 53 removed. The cartridge housing 49 essentially comprises a box with at least one open end. In FIG. 11a cartridge 1' is in an open position for allowing access to the spool. In FIG. 11b all cartridges including cartridge 1' are in the closed position for storage. The cartridge housing 49 includes tongues 53 and grooves or channels 51 along interior surface as shown in FIG. 16. The grooves 51 are aligned for receiving side-by-side a plurality of cable cartridges 1. The side rails 21 of the cartridges are received by the grooves 51 of the cartridge housing. A number of cable housings 49 may be combined into a housing chassis 60 as shown in FIG. 17.

Figure 18:
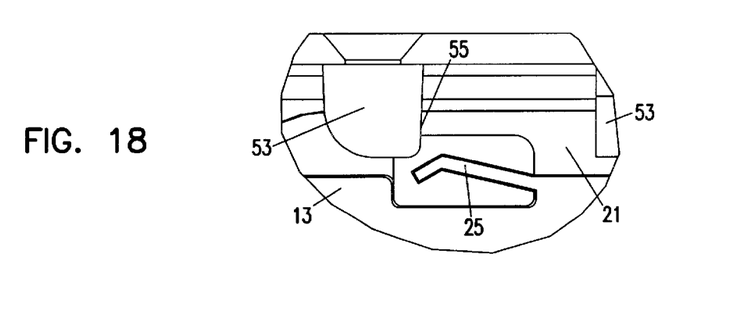
FIG. 18 is a detail view of a detent tab according to the present invention.

The carriage frame 3 may incorporate detent tabs 25 along its side edges 13. The detent tabs cooperate with notches 55 formed in the tongues 53 of the cartridge housing 49 to retain the cartridge 1 within the cartridge housing 49 when the cartridge 1 is in a closed position. The detent tab 25 is bent to allow the cartridge 1 to be pulled from its closed position into an open position. The closed position is when the cartridge is slid into the cartridge housing 49 for storage.

Figure 19:
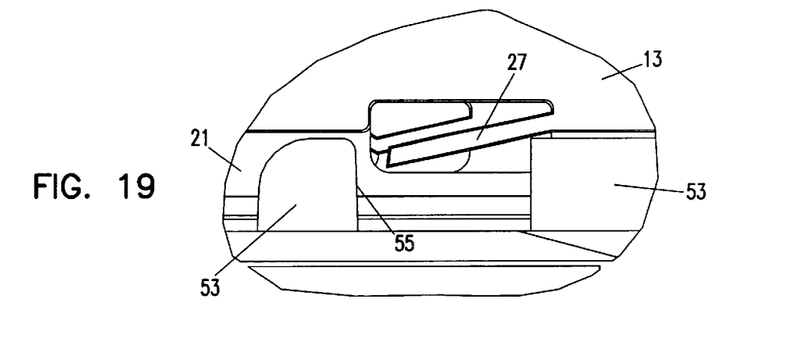
FIG. 19 is a detail view of a catch tab according to the present invention.

The carriage frame 3 may also incorporate catch tabs 27 along its side edges 13. The catch tabs cooperate with notches 55 formed in the tongues 53 of the cartridge housing 49 to retain the cartridge 1 within the cartridge housing 49 when the cartridge 1 is in the open position. The catch tab 27 prevent the cartridge 1 from being pulled out of the cartridge housing 49 by extending into the notches 55 of tongues.

Since many embodiments of the invention can be made without departing from the spirit and scope of the invention, the invention resides in the claims hereinafter appended.

What is claimed is:

1. A cable storage cartridge for storing an excess length of cable, the cartridge comprising:

a carriage frame having first and second pairs of opposed sides forming a periphery of the carriage frame, the frame having an internal wall defining a spool aperture, the internal wall having an annular rail for receiving first and second spool members; at least one side defining a side rail; the frame also defining a first entry channel leading from the spool aperture through one of the sides of the frame;

a first spool member defining a loop channel sized for holding a loop end of the cable in a fixed position relative to the first spool member, the first spool member having a first flange surface received by the spool aperture and on the annular rail of the carriage frame from a first side of the carriage frame, the first flange surface defining multiple transition openings through the first flange surface; and a second spool member having a center post and a second flange surface wherein one of the first spool member and the second spool member includes a clip post, and the other defines a hole for receiving the clip post thereby securing the first and second spool members to each other and capturing the annular rail of the frame between the first and second spool members; the second flange surface and the first flange surface defining a storage chamber beneath the loop channel of the first spool member;

wherein the first and second spool members are rotatably received by the frame and wherein a length of cable to be stored may pass from the loop channel of the first spool member through the transition openings of the first flange surface to the storage chamber where by rotation of the first and second spool members relative to the frame the cable may be wound around the center post of the second spool member and by means of the entry channel may pass from the storage chamber out of the cartridge.

2. The cable storage cartridge of claim 1 wherein the loop channel is defined by at least two curvilinear track walls and two circular members, the track walls being spaced from respective circular members a distance less than two times the thickness of the cable to be stored, the circular members being separated from each other by a distance less than two times the thickness of the cable to be stored.

3. The cable storage cartridge of claim 1 wherein the carriage frame has a detent tab disposed on at least one of the sides.

4. The cable storage cartridge of claim 1 wherein the carriage frame has a catch tab disposed on at least one of the sides.

5. The cable storage cartridge of claim 1 wherein the entry channel is substantially parallel to a side of the carriage frame.

6. The cable storage cartridge of claim 1 wherein the carriage frame defines a second entry channel leading from the spool aperture through one of the sides of the frame wherein the first entry channel is used when the cable to be stored approaches the cartridge from a first direction, and wherein the second entry channel is used when the cable to be stored approaches the cartridge from a second direction.

7. A cable storage cartridge for storing an excess length of cable, the cartridge comprising:

a carriage frame and a spool rotatably received on the carriage frame to rotate relative to the carriage frame complete about an axis of rotation;

the spool having a loop retention surface defining a loop channel sized for releasably receiving a loop end of the cable thereby holding the loop end in a fixed position relative to the spool, the loop channel of the loop retention surface being substantially in a first plane, the loop retention surface also defining transition openings;

the spool having a center post and a base surface which in combination with the loop retention surface define a storage chamber, the storage chamber being in a second plane which is spaced from the first plane of the loop retention surface along the axis of rotation, the transition openings being in communication with the storage chamber; and the carriage frame defining a first entry channel in communication with the storage chamber.

8. The cable storage cartridge of claim 7 wherein the carriage frame further comprises guide rails for slidably mounting the cartridge into a cartridge housing.

9. The cable storage cartridge of claim 7 wherein the loop channel is defined by at least two curvilinear track walls and two circular members, the track walls being spaced from respective circular members a distance less than two times the thickness of the cable to be stored, the circular members being separated from each other by a distance less than two times the thickness of the cable to be stored.

10. The cable storage cartridge of claim 7 wherein the carriage frame further comprises a detent tab for retaining the cartridge in a closed position inside the cartridge housing.

11. The cable storage cartridge of claim 7 wherein the carriage frame further comprises a catch tab for retaining the cartridge in the cartridge housing when the cartridge is slid to an open position.

12. The cable storage cartridge of claim 7 wherein the carriage frame defines a second entry channel in communication with the storage chamber wherein the first entry channel is used when the cable to be stored approaches the cartridge from a first direction, and wherein the second entry channel is used when the cable to be stored approaches the cartridge from a second direction.

13. A cable storage assembly for storing excess lengths of cable, the assembly comprising:

at least one cable cartridge, the cartridge having a carriage frame and a spool rotatably received on the carriage frame to rotate relative to the carriage frame complete about an axis of rotation; the spool having a loop retention surface defining a loop channel sized for releasably receiving a loop end of the cable thereby holding the loop end in a fixed position relative to the spool, the loop channel of the loop retention surface being substantially in a single plane, the loop retention surface also defining transition openings; the spool having a center post and a base surface which in combination with the loop retention surface define a storage chamber, the storage chamber being in a plane which is spaced from the plane of the loop retention surface, the transition openings being in communication with the storage chamber; the carriage frame having guide rails and defining an entry channel in communication with the storage chamber; and a cartridge housing for storing multiple cable cartridges, the cartridge housing having a plurality of channels sized to receive the guide rails of the cable cartridges so that the cartridges may slide from an open accessible position to a closed position within the cartridge housing.

14. The cable storage assembly of claim 13 further comprising a plurality of said cable cartridges disposed in the cartridge housing.

15. The cable storage assembly of claim 13 wherein the cartridge housing defines a detent notch along at least one groove, and wherein the carriage frame of the cable cartridge further comprises a detent tab which acts in combination with the detent notch to retain the cartridge in the closed position inside the cartridge housing, and further wherein the carriage frame of the cable cartridge comprises a catch tab which acts in combination with the detent notch to retain the cartridge in the cartridge housing when the cartridge is slid to the open position.

16. The cable storage assembly of claim 14 wherein the loop channel of the cable cartridge is defined by at least two curvilinear track walls and two circular members, the track walls being spaced from respective circular members a distance less than two times the thickness of the cable to be stored, the circular members being separated from each other by a distance less than two times the thickness of the cable to be stored.

* * * * *

UNITED STATES PATENT AND TRADEMARK OFFICE
CERTIFICATE OF CORRECTION

PATENT NO. : 6,408,124 B1
DATED : June 18, 2002
INVENTOR(S) : Holman et al.

Figure 4:
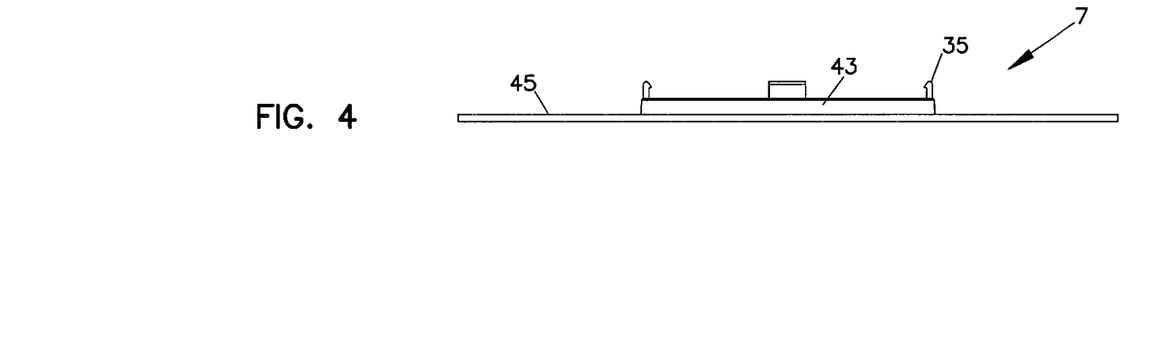
FIG. 4 is a front view of the lower spool member of FIG. 3.

It is certified that error appears in the above-identified patent and that said Letters Patent is hereby corrected as shown below:

Column 1,
Line 43, "FIG. 4" should read -- FIG. 46 --

Column 2,
Line 44, -- an -- should be inserted before "open"
Line 49, "atop" should read -- a top --

Column 3,
Line 37, "10" should be deleted

Column 4,
Line 8, "a 9" should read -- channel 29 --
Line 45, "loop and" should read -- loop end --

Signed and Sealed this

Fourth Day of February, 2003

JAMES E. ROGAN
*Director of the United States Patent and Trademark Office*